(12) United States Patent  
Savvides et al.

(10) Patent No.: US 9,311,564 B2  
(45) Date of Patent: Apr. 12, 2016

(54) FACE AGE-ESTIMATION AND METHODS, SYSTEMS, AND SOFTWARE THEREFOR

(71) Applicant: Carnegie Mellon University, Pittsburgh, PA (US)

(72) Inventors: Marios Savvides, Pittsburgh, PA (US); Keshav Seshadri, Pittsburgh, PA (US); Khoa Luu, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 207 days.

(21) Appl. No.: 14/046,632

(22) Filed: Oct. 4, 2013

(65) Prior Publication Data

US 2014/0099029 A1 Apr. 10, 2014

Related U.S. Application Data

(60) Provisional application No. 61/744,917, filed on Oct. 5, 2012.

(51) Int. Cl.
  *G06K 9/48* (2006.01)
  *G06K 9/46* (2006.01)
  *G06K 9/62* (2006.01)
  *G06K 9/00* (2006.01)

(52) U.S. Cl.
  CPC ............ *G06K 9/481* (2013.01); *G06K 9/00221* (2013.01); *G06K 9/4604* (2013.01); *G06K 9/6256* (2013.01); *G06K 2009/00322* (2013.01)

(58) Field of Classification Search
  USPC ......... 382/115, 117, 118, 190, 197, 209, 218, 382/219; 340/5.52, 5.81, 5.82, 5.83
  See application file for complete search history.

(56) References Cited

U.S. PATENT DOCUMENTS

| | | | |
|---|---|---|---|
| 7,236,615 B2 * | 6/2007 | Miller et al. ................... | 382/118 |
| 7,324,670 B2 * | 1/2008 | Kozakaya .......... | G06K 9/00228 |
| | | | 382/115 |
| 7,502,496 B2 * | 3/2009 | Kozakaya .......... | G06K 9/00228 |
| | | | 382/115 |
| 7,505,621 B1 * | 3/2009 | Agrawal et al. ............... | 382/159 |
| 7,697,787 B2 * | 4/2010 | Illsley .................... | H04N 5/272 |
| | | | 382/118 |
| 7,912,246 B1 * | 3/2011 | Moon ................ | G06K 9/00221 |
| | | | 382/103 |
| 7,953,690 B2 * | 5/2011 | Luo et al. ......................... | 706/47 |
| 8,000,505 B2 * | 8/2011 | Gallagher ..................... | 382/117 |
| 8,520,906 B1 * | 8/2013 | Moon .................. | G06K 9/6263 |
| | | | 382/118 |
| 8,676,740 B2 * | 3/2014 | Ueki .............................. | 706/52 |
| 8,705,875 B1 * | 4/2014 | Ricanek, Jr. .................. | 382/224 |

FOREIGN PATENT DOCUMENTS

CN 101571919 A 11/2009
CN 102226917 A 10/2011

* cited by examiner

*Primary Examiner* — Yosef Kassa

(74) *Attorney, Agent, or Firm* — Downs Rachlin Martin PLLC

(57) ABSTRACT

Age-estimation of a face of an individual is represented in image data. In one embodiment, age-estimation techniques involves combining a Contourlet Appearance Model (CAM) for facial-age feature extraction and Support Vector Regression (SVR) for learning aging rules in order to improve the accuracy of age-estimation over the current techniques. In a particular example, characteristics of input facial images are converted to feature vectors by CAM, then these feature vectors are analyzed by an aging-mechanism-based classifier to estimate whether the images represent faces of younger or older people prior to age-estimation, the aging-mechanism-based classifier being generated in one embodiment by running Support Vector Machines (SVM) on training images. In an exemplary binary youth/adult classifier, faces classified as adults are passed to an adult age-estimation function and the others are passed to a youth age-estimation function.

36 Claims, 4 Drawing Sheets

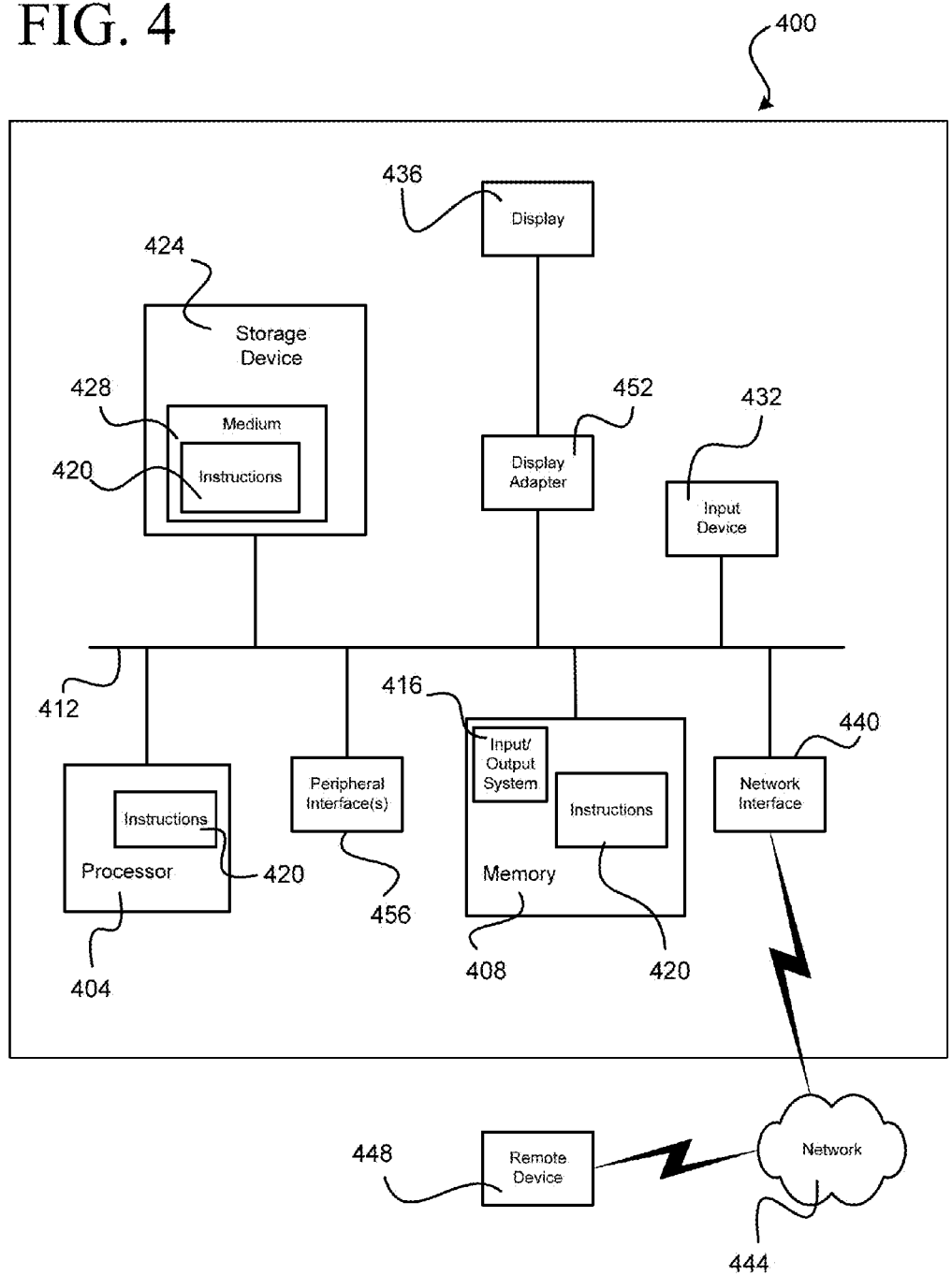

FACE AGE-ESTIMATION AND METHODS, SYSTEMS, AND SOFTWARE THEREFOR

RELATED APPLICATION DATA

This application claims the benefit of priority of U.S. Provisional Patent Application Ser. No. 61/744,917, filed on Oct. 5, 2012, and titled "Contourlet Appearance Model", which is incorporated by reference herein in its entirety.

STATEMENT OF GOVERNMENT INTEREST

Subject matter of this disclosure was made with government support under Army Research Office grants DAAD19-02-1-0389 and W911NF-09-1-0273. The government may have certain rights in this subject matter.

FIELD OF THE INVENTION

The present invention generally relates to the field of image processing. In particular, the present invention is directed to face age-estimation and methods, systems, and software therefor.

BACKGROUND

Face recognition is one of the most difficult and challenging tasks in computer vision, partly because of large variations in human faces. Difficulty and challenge is even higher for face age-estimation. Researchers have been developing technologies for face age-estimation due to the demands of many real-world operating scenarios that require accurate, efficient, uncooperative, and cost-effective solutions, such as automated control and surveillance systems. Accurate age-estimation may be of great benefit to businesses, such as convenience stores, restaurants, and others, who are required to forbid underage access to, for example, alcohol or tobacco. Age-estimation systems can also be applicable in homeland security technologies, criminal identification, management of e-documents and electronic customer relationships, all without requiring imposing password prompts, password change reminders, etc. In restaurants and other businesses, age-recognition systems may be used help to identify trends in business relative to the ages of customers. Additionally, these systems can help to prevent children from viewing or otherwise consuming unacceptable media or programming and can even be used to thwart underage people from driving cars before they reach a legal driving age.

Aging of human faces is a complicated process influenced by many factors such as gender, ethnicity, heredity factors and environmental factors, including cosmetic interventions, societal pressure, relative sun exposure, and drug or alcohol consumption. In this process, there are some controllable factors (i.e., gender, ethnicity, heredity, etc.) that can be exploited in order to recognize trends in the aging of human faces. However, other uncontrollable factors, such as environment, living styles, and sun exposure (photoaging), can prove quite challenging to deal with. Therefore, correctly estimating an age from a face is a huge challenge even for humans, let alone for computing devices.

The effects of age on the human face has been studied in numerous research fields, including orthodontics, anthropology, anatomy, forensic art, and cognitive psychology. However, compared to these aging-related fields, computer science approaches for aging problems are relatively new. From the viewpoint of computer science, face aging technologies generally address two areas: face age-estimation and face age-progression. The face age-estimation problem can be addressed with computer software that has the ability to recognize the ages of individuals in a given photo. Meanwhile, the face age-progression problem has the ability to predict the future faces of an individual in a given photo.

To achieve an accurate, efficient, uncooperative, and cost-effective solution to the problem of face age-estimation, it becomes necessary to extract as much unique information as possible from each image in question and to use such information in an exhaustive comparison. However, these methods are known to be computationally expensive and may require special tweaking in order to generate meaningful results. More accurate and efficient face recognition methods are desired in numerous applications, including those discussed above, which demand near real-time computation and do not require user cooperation.

SUMMARY OF THE DISCLOSURE

It is understood that the scope of the present invention is limited to the scope provided by the independent claims, and it is also understood that the scope of the present invention is not limited to: (i) the dependent claims, (ii) the detailed description of the non-limiting embodiments, (iii) the summary, (iv) the abstract, and/or (v) description provided outside of this document (that is, outside of the instant application as filed, as prosecuted, and/or as granted).

In one implementation, the present disclosure is directed to a method of generating a face age-estimation for a face represented by first image data as a function of faces represented by second image data and having assigned landmark points and known ages. The method includes receiving, by a face age-estimation system, the first image data; applying, by the face age-estimation system, a contourlet appearance model (CAM) algorithm to the first image data so as to generate a first feature vector; executing, by the face age-estimation system, an age classifier on the first feature vector so as to identify an estimated age group for the face represented by the first image data as a function of the assigned landmark points of the second image data; and applying, by the face age-estimation system, an aging function to the first feature vector so as to generate the face age-estimation as a function of the assigned landmark points of the second image data.

In another implementation, the present disclosure is directed to a method of face age-estimation. The method includes extracting, by a feature extractor, facial features from an image of a test subject; and mapping, by a feature-space-to-age-space mapping unit, the facial features to one of at least two differing age groups having corresponding differently calibrated mapping functions.

In yet another implementation, a machine-readable storage medium containing machine executable instructions for performing a method of generating a face age-estimation for a face represented by first image data as a function of faces represented by second image data and having assigned landmark points and known ages. The machine-executable instructions include a first set of machine-executable instructions for receiving the first image data; a second set of machine-executable instructions for applying a contourlet appearance model (CAM) algorithm to the first image data so as to generate a first feature vector; a third set of machine-executable instructions for executing an age classifier on the first feature vector so as to identify an estimated age group for the face represented by the first image data as a function of the assigned landmark points of the second image data; and a fourth set of machine-executable instructions for applying an aging function to the first feature vector so as to generate the face age-estimation as a function of the assigned landmark points of the second image data.

In still yet another implementation, a machine-readable storage medium containing machine executable instructions for performing a method of face age-estimation. The machine-executable instructions include a first set of machine-executable instructions for extracting facial features from an image of a test subject; and a second set of machine-executable instructions for mapping the facial features to one of at least two differing age groups having corresponding differently calibrated mapping functions.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 4 is a diagram illustrating a computing system that can implement methods of the present disclosure and/or various portions of such methods.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to methods and software that include steps and/or machine-readable instructions for estimating an age of a person represented in first image data (e.g., a digital or digitized photograph or other visual image). The present inventors have discovered that verification rates for image-based face age-estimation can be greatly improved by performing a contourlet transform on the first image data and by classifying the subject face according to aging mechanisms. In one embodiment, a subject face is classified as younger or older before performing face age-estimation. Younger and older people have fundamentally different aging mechanisms, such that at least two aging functions can be constructed, though it will be appreciated that three or more aging functions, each corresponding to a different aging period, such as early childhood, adolescence, middle age, or senior, among others, could be used.

Figure 1A:
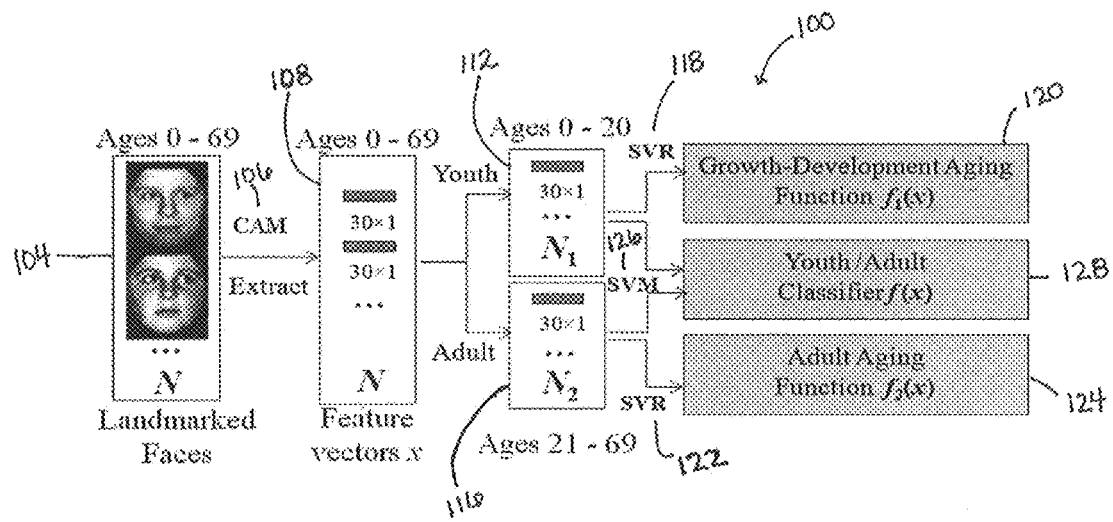
FIG. 1A is a diagrammatic representation illustrating a face age-estimation training system and a corresponding method of face age-estimation training.
Figure 1B:
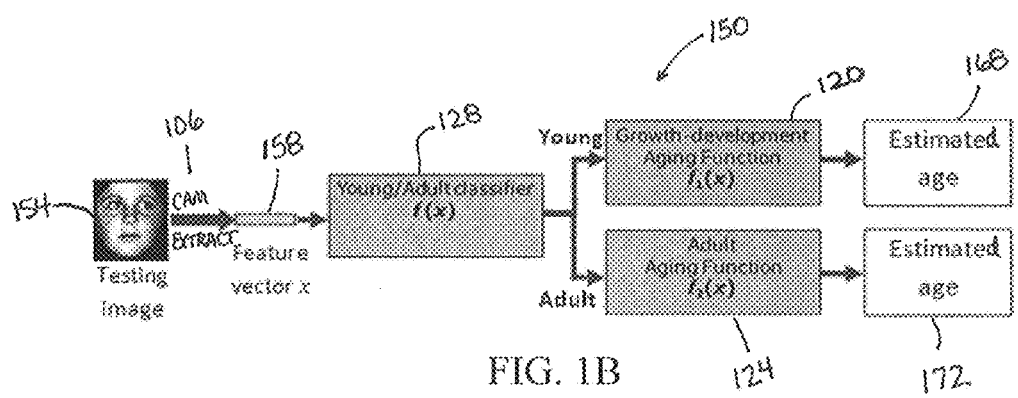
FIG. 1B is a diagrammatic representation illustrating a face age-estimation system and a corresponding method of face age-estimation.

Referring now to the drawings, FIG. 1A illustrates components of a face age-estimation training method 100 according to an embodiment of the invention, while FIG. 1B illustrates components of a face age-estimation method 150 according to an exemplary embodiment of the present invention. Face age-estimation training method 100 and face-age estimation method 150 may be implemented by face age-estimation systems, which may be implemented by any one or more computing devices that generally are: 1) programmed with instructions for performing steps of a method of the present disclosure; 2) capable of receiving and/or storing data necessary to execute such steps; and 3) capable of providing any user interface that may be needed for a user to interact with the system, including setting the system up for an age-estimation session and estimation results, among other things. Those skilled in the art will readily appreciate that an age-estimation system of the present disclosure can range from a self-contained device, such as a smartphone, tablet computer, laptop computer, desktop computer, sever, web-server, to a network of two or more of any of these devices. Fundamentally, there is no limitation on the physical construct of an age-estimation system, as long as it can provide the features and functionality described herein.

For illustrative purposes, FIG. 4, which is described more fully below, represents an exemplary computing system 400 that can be used to implement various steps of methods 100 and 150 and any other method incorporating features/functionality disclosed herein. It is noted that when the relevant software is combined with suitable hardware for executing the software and implementing the functionality embodied in the software, the combination of the hardware with the controlling software becomes a system having the corresponding functionality. For example, when method 150 is performed by a suitable computing system, such as computing system 400, the resulting combination of hardware and controlling software may be considered to form an age-estimation system that may receive image data containing data representing a face and generate an estimated age based on that data. Likewise, when software instructions for performing any subset of functionality within a particular method is combined with executing hardware, the combination of the hardware and controlling software effectively becomes a machine for carrying out the relevant functionality. For example, software for extracting facial features from an image, when executed on suitable hardware, becomes a feature extractor. Other functional components under this scheme include, but are not limited to a feature-space-to-age-space mapping unit, a classifier, a support vector machine, an age-training module, a contourlet appearance model processor, and a support vector regression processor, among others. Those skilled in the art will readily understand the combination of software and hardware necessary to create these functional components. It is noted that while these functional components may often be embodied using a single general-purpose processor or set of such processors, alternative systems can be constructed using discrete physical components executing suitable software and/or having circuitry physically configured for providing the requisite functionality or portion(s) thereof.

Typically, the first image data received represents an image of one or more persons' faces for which ages are desired to be estimated. Those skilled in the art will readily appreciate that the image data will typically be utilized by methods 100 and 150 in the form of a digital image contained in a suitable image file, such as a JPG file, a GIF file, a PNG file, a TIFF file, or a RAW file, among others. Consequently, the term "image" and like terms as used herein refer not only to a print image, an electronically rendered image, etc., but also to the image-defining content of 1) a digital image file, 2) a signal, 3) a digital memory, or 4) other medium containing that information. Image data may be stored in an age-estimation system using an appropriate computer storage system (see, e.g., FIG. 4). Image data may be received from a database, through the Internet, from a security camera, and/or in any other manner known in the art to be suitable for providing image data. In one embodiment, image data may represent a single 2D image of front view of a subject's face, while, in other embodiments, further processing may be necessary to address issues such as side views of faces, tilted faces, etc., as is known in the art.

Figure 2:
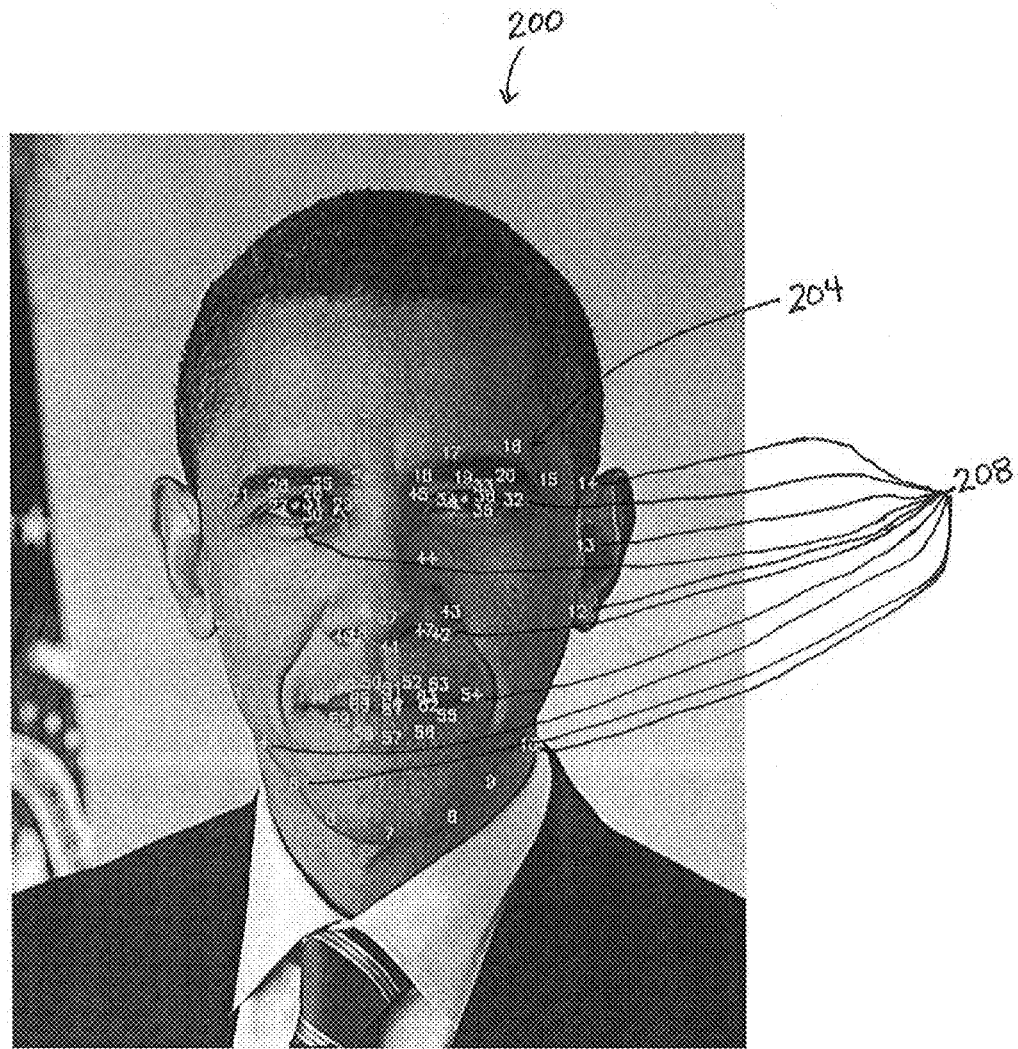
FIG. 2 is a photograph of a face with landmarks assigned in accordance with the present disclosure.

In FIG. 1A, method of face age-estimation training 100 begins with a database of second image data 104 comprising faces having a number of assigned landmark points, which may be of any number and may be advantageously assigned in a specific anthropometric order. See, for example, FIG. 2, which illustrates a photograph 200 of a face 204 with 68 assigned landmark points 208, with points 0-14 being landmark points for the outside contour of a face, points 15-20 being landmark points for the right eyebrow, points 21-26 being landmark points for the left eyebrow, other points being landmark points for eye outlines, iris outlines, nose outlines, nose center, nostrils, lip outlines, top lip and bottom lip outlines, etc. Referring back to FIG. 1A, a feature extraction algorithm, in this embodiment a contourlet appearance model (CAM) algorithm 106, may be used to extract feature vectors x 108 from face images I represented in second image data 104. A CAM is an appropriate method for modeling the complexities of an aging face, because it can represent both the shape structure of a face and its constituent parts, for example, nose, lips, lower face, as well as the texture of the face. A CAM is a combination of shape variation, which is a primary factor in the growth and development period of young people, and texture variation, which can often be a more relevant factor in estimating the age of older persons.

Figure 3:
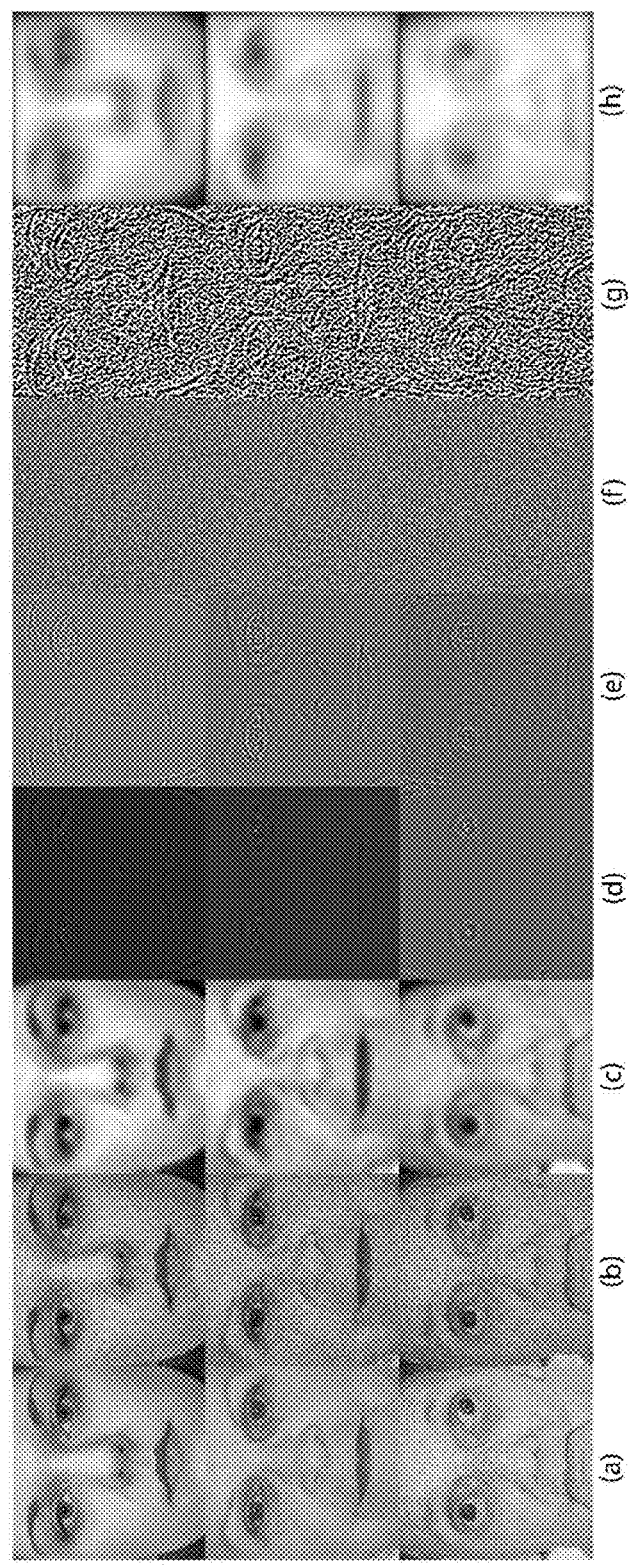
FIG. 3 contain visual representations of various feature extraction algorithms, including algorithms used in an exemplary embodiment of the present invention.

A CAM is used as a statistical model of appearance and is generated by combining a modified active shape model (MASM) that represent the facial structure and a quasi-localized texture model that represents the pattern of contourlet-based intensities (skin texture) across a facial image patch. Compared to other facial feature extraction methods, such as local binary patterns (LBP) and Gabor wavelet transforms, a CAM has the ability to extract more robust facial features that encode age information. In addition, a CAM is robust against noise (as shown, for example, in FIG. 3), because it can distinguish noise (FIG. 3f) from meaningful signals (e.g., FIGS. 3d-3e) in a given noisy image (FIG. 3c). FIG. 3 illustrates features extracted by different texture extraction methods: (a) an original facial image; (b) a noisy image with standard deviation of noise σ set to 0.1; (c)-(f) images illustrating low-pass, strong edge, weak edge and noise components, respectively, obtained after applying a logarithmic nonsubsampled contourlet transform (LNSCT) on the noisy image; (g) an LBP map of the noisy image; and (h) a noisy image filtered using a Gabor filter. A CAM can be decomposed into two models: the MASM shape model x (such as in Equation 1, below) and the contourlet texture model g (such as in Equation 2, below). A CAM has three main processing steps: first, given a training set of second, landmarked images 104, an MASM may be generated to model the shape variation in the images; then, a statistical principal component analysis (PCA) model of the contourlet-level appearance may be built; and finally, a CAM may be generated by applying a further statistical PCA approach to the shape and appearance parameters.

The contourlet-level appearance may be generated as follows: 1) apply appearance alignment by warping the control points to match the mean shape by using the Delaunay triangulation algorithm or other suitable algorithm for warping control points; 2) correct the lighting of gray-level appearance; and 3) apply non-subsample contourlet transform on the gray-level appearance to obtain weak edge texture vectors (FIG. 3e). Then, both the gray-level (from image) and weak edges texture (from contourlet texture) are used to model the contourlet-level appearance. A statistical PCA model may be applied in order to obtain a linear model (Equations 2 and 3, wherein $\bar{g}$ and $\bar{w}$ are the mean normalized gray-level and weak edge texture vectors, $\Phi_g$ and $\Phi_w$ are a set of orthogonal models of variations, and $b_g$ and $b_w$ are sets of facial texture parameters) for the extracted appearances.

$$\hat{x} = \bar{x} + \Phi_s b_s \quad \text{(Equation 1)}$$

$$g = g\bar{g} + \Phi_g b \quad \text{(Equation 2)}$$

$$w = \bar{w} + \Phi_w b \quad \text{(Equation 3)}$$

To correct the lighting of gray-level appearance, a first variable may be initialized to the first gray level sample $g_1$ of images I, then, for each of the other gray level samples, $g_2$-$g_N$: the inner product of the first variable with the current gray level sample may be calculated and assigned to a second variable; then, the inner product of the current gray level sample and 1 may be calculated and divided by the number of elements in the vectors and the result may be assigned to a third variable; and, finally, the current gray level sample may be normalized by calculating the difference between the current gray level sample and the inner product of the third variable and 1, then dividing the result by the second variable. The normalized gray level samples may replace the original gray level samples or may be saved in a separate location.

Since there may be correlations between the shape and contourlet-level variations, a further statistical PCA approach may be applied to the data as follows: for each feature vector, a concatenated vector can be generated as in Equation 4, wherein $W_s$ is a diagonal matrix of weights for each shape parameter, allowing for the difference in units between the shape and gray models, and $P_S^T$, $P_w^T$ and $P_g^T$ are the constructed orthogonal subspaces of shape, contourlet texture and gray-level, respectively, which are strongly related to $\Phi_S$ and $\Phi_w$ in Equations 2 and 3. All three components $b_s$, $b_w$ and $b_g$ contribute to modeling a face at different levels; by combining these, it is possible to represent faces uniquely.

$$b = \begin{pmatrix} W_S b_S \\ W_w b_w \\ W_g b_g \end{pmatrix} = \begin{pmatrix} W_S P_S^T (x - \bar{x}) \\ W_w P_w^T (w - \bar{w}) \\ W_g P_g^T (g - \bar{g}) \end{pmatrix} \quad \text{(Equation 4)}$$

By applying a PCA model on the vectors in Equation 4, a further model can be generated, as shown in Equation 5, wherein Q represents the eigenvectors generated through PCA and c is a vector of appearance parameters controlling both the shape and gray-levels of the model. Note that because the shape and gray-model parameters have been normalized, they will have a zero mean, and, as such, so will c.

$$b \approx Qc \quad \text{(Equation 5)}$$

The CAM result, b, encodes correlations between the parameters of the shape model and those of the texture model across the training set. The final training images can be represented according to Equation 6, wherein $X_i$ represents the shape or texture of a training image $I_i$, $\bar{X}$ is the mean of the training images' parameters, P is the eigenvector matrix generated by the training procedure, and $x_i$ is a vector of weights referred to as a feature vector. $x_i$ is equivalent to c in Equation 5.

$$X_i = \bar{X} + Px_i \quad \text{(Equation 6)}$$

During the training procedure, feature vectors x 108 may be extracted from second image data 104 representing face images I. In FIG. 1A: N refers to the total number of training images, for example, the number that have faces ranging in ages from infant to sixty-nine years; $N_1$ refers to the number of youth training face feature vectors 112 generated from youth training faces ranging in age from infant (0 years) to, for example, 20 years (babies, children, teens and young adults); and $N_2$ refers to the number of adult training face feature vectors 116 generated from adult training faces ranging in ages from, for example, 21 years to, for example, 69 years (adults). As such, $N=N_1+N_2$. Note that the specific cut-off years (here, 20, 69) may be modified and/or their number (i.e., the number of age groupings) may be increased, resulting in, for example, more than one aging function, more than one growth-development function, and more than one age classifier. Feature vectors x may serve as inputs to an age classifier and two aging functions. There are two main steps in the classification module: first, Support Vector Regression 118, 122 may be used on the youth training face feature vectors 112 and adult training face feature vectors 116 to construct two differently-calibrated aging functions, a growth and development mapping function $f_1(x)$ 120 and an adult aging mapping function $f_2(x)$ 124, respectively. Then, support vector machines 126 are used on both the youth training face feature vectors 112 and adult training face feature vectors 116 in order to build an age classifier $f(x)$ 128, which, in an embodiment, is capable of distinguish between youths (ranging in ages from infant to 20) and adults (ranging in ages from 21 to 69), though in other embodiments it may be made to distinguish between three or more age groups.

Given N training points $(x_1, y_1), (x_2, y_2), \ldots, (x_N, y_N)$ with $x_i \in R^n$ and $y_i \in \{-1,1\}$, $i=1, \ldots, N$ and supposing that these points are linearly separable, we have to find a set of $N_s$ support vectors $s_i (N_s \leq N)$, coefficient weights $a_i$, a constant b and the linear decision surface. Equation 7 results in the distance to the support vectors being maximized, wherein w is defined according to Equation 8.

$$w \cdot x + b = 0 \quad \text{(Equation 7)}$$

$$w = \Sigma_{i=1}^{N_s} a_i y_i s_i \quad \text{(Equation 8)}$$

SVMs can be extended to nonlinear decision surfaces by first using a mapping function $\Phi$ to map these points to some other Euclid space H that is linearly separable, with the given regularization parameter $C>0$, $\Phi: R^n | \to H$. Secondly, a kernel function K may be defined, where $K(x_i, x_j) = \Phi(x_i) \bullet \Phi(x_j)$, $x_i$ and $x_j$ being image samples and $\Phi$ being the mapping function, then the nonlinear decision surface may be defined according to Equation 9, wherein $a_i$ and b are the optimal solution of quadratic programming (QP) according to Equations 10 and 11.

$$\Sigma_{i=1}^{N_s} a_i y_i K(s_i, x) + b = 0 \quad \text{(Equation 9)}$$

$$\min_{w,b,\xi} \tfrac{1}{2}\|w\|^2 C \Sigma_{i=1}^{N_s} \xi_i \quad \text{(Equation 10)}$$

$$y_i(w \cdot x_i b) \geq 1 - \xi_i \text{ with } \Sigma_i \geq 0 \quad \text{(Equation 11)}$$

A goal in SVR is to build a hyper-plane as close to as many of the training points as possible. Given N training points $(x_1, y_1), (x_2, y_2), \ldots, (x_N, y_N)$ with $x_i \in R^n$ and $y_i \in R$, $i=1, \ldots, N$, a hyper-plane can be constructed along with the values of w and b. The hyper-plane w may be selected with a small norm while simultaneously minimizing the sum of the distances from these points to the hyper-plane, measured by using Vapnik's $\epsilon$-insensitive loss function, as shown in Equation 12.

$$|y_i - (w \cdot x_i + b)|_\epsilon = \quad \text{(Equation 12)}$$
$$\begin{cases} 0 & \text{if } |y_i - (w \cdot x_i + b)| \leq \varepsilon \\ |y_i - (w \cdot x_i + b)| - \varepsilon & \text{otherwise} \end{cases}$$

In Equation 12, the value of $\varepsilon$ may be selected by the user, and the trade-off for finding a hyper-plane with good regression performance may be controlled via the given regularization parameter C, which may be determined empirically depending on design requirements. The QP problem associated with SVR is given by Equations 13, 14, and 15.

$$\min_{w,b,\xi,\xi^*} \tfrac{1}{2}\|w\|^2 + C \Sigma_{i=1}^{N_s}(\xi_i + \xi_i^*) \quad \text{(Equation 13)}$$

$$y_i - (w \cdot x_i + b) \leq \epsilon + \Sigma_i \text{ with } \Sigma_i \geq 0 \quad \text{(Equation 14)}$$

$$-y_i + (w \cdot x_i + b) \geq \epsilon + \Sigma_i^* \text{ with } \Sigma_i^* \geq 0 \quad \text{(Equation 15)}$$

A binary classifier $f(x)$ 128 (as in Equation 16, below), which may be used to distinguish youths from adults, is first built by SVMs 126 (as discussed above). In the training steps, the inputs $x_i$ refer to the feature vectors 108 extracted using Equation 6 from a given face image and their corresponding labels $y_i \in \{-1,1\}$ (1 for children, -1 for adults). To configure the SVM parameters, a Gaussian kernel K may be used (as in Equation 17), which, in some situations, may generate the best classification rate among possible kernel functions (e.g., linear, polynomial, joint classifier basis (JCB), sigmoid, etc.).

$$f(x) \sum_{i=1}^{N_s} \alpha_i y_i K(s_i, x) + b \quad \text{(Equation 16)}$$

$$K(x_i, x_j) = e^{-\frac{1}{2\sigma^2}\|x_i - x_j\|^2} \quad \text{(Equation 17)}$$

In the testing phase, to estimate the age of an individual's face represented by first image data 154, first, the CAM algorithm 106 may be used to extract feature vector x 158 from the first image data. As alluded to above, second image data may reside in a pre-assembled database of images of landmarked faces, which may be used to generate aging functions 120, 124 and an age classifier 128 for use in estimating an age of a subject of the first image data. It is noted that the face age-estimation system that generates the aging functions 120, 124 and age classifier 128 need not necessarily generate the age-estimation of the first image data. For example, the images in the pre-assembled database may have been "preprocessed" to generate the aging functions and age classifier. This may be so in embodiments in which a particular aging function and/or age classifier has become a standard, such that when each image is added to the database, the aging functions and age classifier are automatically generated/updated as part of the storing process. However, in other examples in which the individual images within a database of training images have not been subjected to processing, an age-estimation system may perform these steps on the second image data, either singly as needed or as part of a larger step of processing some or all of the images in the database to build or update aging functions and/or an age classifier. As with the first image data, such second image data may be preprocessed to account for lighting or other image defects or abnormalities. Once feature vector x 158 has been extracted from the first image data 154, the individual represented by the first image data may be recognized as a youth or an adult by the SVM-trained youth/adult classifier $f(x)$ 128. Finally, based on the determination of the young/adult classifier, an appropriate aging function may be used to determine the age of the face: $f_1(x)$ 120 may be used if the image is classified as a youth; otherwise $f_2(x)$ 124 may be used. An estimated age 168 or 172 may be generated using the growth and development 120 or adult aging function 124, respectively, as appropriate.

Estimated ages 168, 172 may be provided in the form of a single age or age indicator (such as a filename or hash code), which may optionally be provided with a corresponding confidence factor indicating an amount of correlation between the estimated ages and their feature vectors x 158. Alternatively, estimated ages 168, 172 may be provided in the form of a set of ages or age indicators, each of which may be provided with corresponding confidence factors. Methods of calculating confidence intervals and the like are well known in the art and, accordingly, will not be described in detail. Estimated ages 168, 172 may be stored in a face age-estimation system using an appropriate computer storage system (see, e.g., FIG. 4) and may be transmitted to a database, through the Internet, to a security system, and/or in any other manner known in the art to be suitable for providing face age-estimation results.

FIG. 4 shows a diagrammatic representation of one embodiment of a computer in the exemplary form of a computing system 400 that contains a set of instructions for implementing any one or more of the aspects and/or methodologies of the present disclosure, including implementing methods 100 and 150 and/or any of the other methods of the present disclosure, or portion(s) thereof. Computing system 400 includes a processor 404 and a memory 408 that communicate with each other, and with other components, via a bus 412. Bus 412 may include any of several types of bus structures including, but not limited to, a memory bus, a memory controller, a peripheral bus, a local bus, and any combinations thereof, using any of a variety of bus architectures.

Memory 408 may include various components (e.g., machine readable media) including, but not limited to, a random access memory component (e.g., a static RAM "SRAM", a dynamic RAM "DRAM", etc.), a read only component, and any combinations thereof. In one example, a basic input/output system 416 (BIOS), including basic routines that help to transfer information between elements within computing system 400, such as during start-up, may be stored in memory 408. Memory 408 may also include (e.g., stored on one or more machine-readable storage media) instructions (e.g., software) 420 embodying any one or more of the aspects and/or methodologies of the present disclosure. In another example, memory 408 may further include any number of program modules including, but not limited to, an operating system, one or more application programs, other program modules, program data, and any combinations thereof.

Computing system 400 may also include a storage device 424. Examples of a storage device (e.g., storage device 424) include, but are not limited to, a hard disk drive for reading from and/or writing to a hard disk, a magnetic disk drive for reading from and/or writing to a removable magnetic disk, an optical disk drive for reading from and/or writing to an optical medium (e.g., a CD, a DVD, etc.), a solid-state memory device, and any combinations thereof. Storage device 424 may be connected to bus 412 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 424 (or one or more components thereof) may be removably interfaced with computing system 400 (e.g., via an external port connector (not shown)). Particularly, storage device 424 and an associated machine-readable storage medium 428 may provide nonvolatile and/or volatile storage of machine-readable instructions, data structures, program modules, and/or other data for computing system 400. In one example, software 420 may reside, completely or partially, within machine-readable storage medium 428. In another example, software 420 may reside, completely or partially, within processor 404. It is noted that the term "machine-readable storage medium" does not include signals present on one or more carrier waves.

Computing system 400 may also include an input device 432. In one example, a user of computing system 400 may enter commands and/or other information into computing system 400 via input device 432. Examples of an input device 432 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), touchscreen, and any combinations thereof. Input device 432 may be interfaced to bus 412 via any of a variety of interfaces (not shown) including, but not limited to, a serial interface, a parallel interface, a game port, a USB interface, a FIREWIRE interface, a direct interface to bus 412, and any combinations thereof. Input device 432 may include a touch screen interface that may be a part of or separate from display 436, discussed further below. Input device 432 may be utilized as a user selection device for selecting one or more graphical representations in a graphical interface as described above.

A user may also input commands and/or other information to computing system 400 via storage device 424 (e.g., a removable disk drive, a flash drive, etc.) and/or network interface device 440. A network interface device, such as network interface device 440 may be utilized for connecting computing system 400 to one or more of a variety of networks, such as network 444, and one or more remote devices 448 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 444, may employ a wired and/or a wireless mode of communication. In general, any network topology may be used. Information (e.g., data, software 420, etc.) may be communicated to and/or from computing system 400 via network interface device 440.

Computing system 400 may further include a video display adapter 452 for communicating a displayable image to a display device, such as display device 436. Examples of a display device include, but are not limited to, a liquid crystal display (LCD), a cathode ray tube (CRT), a plasma display, a light emitting diode (LED) display, and any combinations thereof. In addition to a display device, a computing system 400 may include one or more other peripheral output devices including, but not limited to, an audio speaker, a printer, and any combinations thereof. Such peripheral output devices may be connected to bus 412 via a peripheral interface 456. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the system and method of the present invention, what has been described herein is merely illustrative of the application of the principles of the present invention. Additionally, although the methods herein have been illustrated as being performed in a specific order, the ordering is highly variable within ordinary skill to achieve the face age-estimation methods, systems, and software described herein. Accordingly, this description is meant to be taken only by way of example, and not to otherwise limit the scope of this invention.

What is claimed is:

1. A method of generating a face age-estimation for a face represented by first image data as a function of faces represented by second image data and having assigned landmark points and known ages, the method comprising:
   receiving, by a face age-estimation system, the first image data;
   applying, by the face age-estimation system, a contourlet appearance model (CAM) algorithm to the first image data so as to generate a first feature vector;
   executing, by the face age-estimation system, an age classifier on the first feature vector so as to identify an estimated age group for the face represented by the first image data as a function of the assigned landmark points of the second image data; and
   applying, by the face age-estimation system, an aging function to the first feature vector so as to generate the face age-estimation as a function of the assigned landmark points of the second image data.

2. A method according to claim 1, further comprising:
   receiving, by the face age-estimation system, the second image data;
   applying, by the face age-estimation system, a CAM algorithm to the second image data so as to generate a set of training feature vectors; and
   executing, by the face age-estimation system, one or more Support Vector Regressions to generate two or more separate aging functions associated with respective ones of at least two distinct segments of the known ages of the second image data as a function of the training feature vectors; and
   executing, by the face age-estimation system, one or more Support Vector Machines to generate an age classifier capable of estimating to which of the ones of the at least two distinct segments of the known ages of the second image data the first image data is more likely to correspond.

3. A method of face age-estimation, comprising:
   extracting, by a feature extractor, facial features from an image of a test subject; and
   mapping, by a feature-space-to-age-space mapping unit, the facial features to one of at least two differing age groups having corresponding differently calibrated mapping functions, wherein said mapping comprises classifying, by a classifier, the test subject into the one of the at least two age groups using a contourlet appearance model.

4. A method according to claim 3, wherein said mapping further comprises, classifying, by a classifier, the test subject into the one of the at least two age groups.

5. A method according to claim 4, wherein the at least two age groups comprise a youth age group and an adult age group.

6. A method according to claim 5, wherein the youth age group contains ages 0 to 20 years, and the adult age group excludes ages 0 to 20 years.

7. A method according to claim 4, wherein said classifying includes using a support vector machine executing a Gaussian kernel.

8. A method according to claim 4, wherein said mapping includes selecting one of said differently calibrated mapping functions based on a result of said classifying.

9. A method according to claim 3, wherein said mapping comprises using a support vector machine executing a Gaussian kernel.

10. A method according to claim 3, wherein said extracting facial features includes extracting features comprising facial shape structure and texture.

11. A method according to claim 3, further comprising locating the facial features using facial landmarks indicating locations of one or more of an outside contour, eyebrows, eye outlines, iris outlines, nose outlines, nose center, nostrils, lip outlines, top lip, and bottom lip outlines.

12. A method according to claim 3, further comprising normalizing the image prior to said extracting facial features.

13. A method according to claim 12, wherein said normalizing comprises applying appearance alignment by warping control points to match mean shape using a triangulation algorithm and correcting grey-level appearance lighting.

14. A method according to claim 3, wherein said extracting includes extracting facial features from a single 2D image of a front view of a face of the test subject.

15. A method according to claim 3, further comprising an age-training module.

16. A method according to claim 3, wherein said mapping is performed within a smartphone or tablet computer.

17. A method according to claim 3, further comprising receiving the image within a computer workstation via a camera in operative communication with the computer workstation.

18. A method according to claim 3, wherein said mapping includes executing a support vector regression.

19. A machine-readable storage medium containing machine executable instructions for performing a method of generating a face age-estimation for a face represented by first image data as a function of faces represented by second image data and having assigned landmark points and known ages, said machine-executable instructions comprising:
   a first set of machine-executable instructions for receiving the first image data;
   a second set of machine-executable instructions for applying a contourlet appearance model (CAM) algorithm to the first image data so as to generate a first feature vector;
   a third set of machine-executable instructions for executing an age classifier on the first feature vector so as to identify an estimated age group for the face represented by the first image data as a function of the assigned landmark points of the second image data; and
   a fourth set of machine-executable instructions for applying an aging function to the first feature vector so as to generate the face age-estimation as a function of the assigned landmark points of the second image data.

20. A machine-readable storage medium according to claim 19, further comprising:
   a fifth set of machine-executable instructions for receiving the second image data;
   a sixth set of machine-executable instructions for applying a CAM algorithm to the second image data so as to generate a set of training feature vectors; and
   a seventh set of machine-executable instructions for executing one or more Support Vector Regressions to generate two or more separate aging functions associated with respective ones of at least two distinct segments of the known ages of the second image data as a function of the training feature vectors; and
   an eighth set of machine-executable instructions for executing one or more Support Vector Machines to generate an age classifier capable of estimating to which of the ones of the at least two distinct segments of the known ages of the second image data the first image data is more likely to correspond.

21. A machine-readable storage medium containing machine executable instructions for performing a method of face age-estimation, said machine-executable instructions comprising:
   a first set of machine-executable instructions for extracting facial features from an image of a test subject; and
   a second set of machine-executable instructions for mapping the facial features to one of at least two differing age groups having corresponding differently calibrated mapping functions, wherein said mapping includes classifying, by a classifier, the test subject into the one of the at least two age groups using a contourlet appearance model.

22. A machine-readable storage medium according to claim 21, wherein said second set of machine-executable instructions includes machine-executable instructions for classifying, by a classifier, the test subject into the one of the at least two age groups.

23. A machine-readable storage medium according to claim 22, wherein the at least two age groups comprise a youth age group and an adult age group.

24. A machine-readable storage medium according to claim 23, wherein the youth age group contains ages 0 to 20 years, and the adult age group excludes ages 0 to 20 years.

25. A machine-readable storage medium according to claim 22, wherein said second set of machine-executable instructions including machine-executable instructions for classifying includes machine-executable instructions for using a support vector machine executing a Gaussian kernel.

26. A machine-readable storage medium according to claim 22, wherein said second set of machine-executable instructions including machine-executable instructions for classifying includes machine-executable instructions for selecting one of said differently calibrated mapping functions based on a result of said classifying.

27. A machine-readable storage medium according to claim 21, wherein said second set of machine-executable instructions includes machine-executable instructions for using a support vector machine executing a Gaussian kernel.

28. A machine-readable storage medium according to claim 21, wherein said first set of machine-executable instructions includes machine-executable instructions for extracting features comprising facial shape structure and texture.

29. A machine-readable storage medium according to claim 21, further comprising a third set of machine-executable instructions for locating the facial features using facial landmarks indicating locations of one or more of an outside contour, eyebrows, eye outlines, iris outlines, nose outlines, nose center, nostrils, lip outlines, top lip, and bottom lip outlines.

30. A machine-readable storage medium according to claim 21, further comprising a third set of machine-executable instructions for normalizing the image prior to executing said first set of machine-executable instructions.

31. A machine-readable storage medium according to claim 30, wherein said third set of machine-executable instructions includes machine-executable instructions for applying appearance alignment by warping control points to match mean shape using a triangulation algorithm and correcting grey-level appearance lighting.

32. A machine-readable storage medium according to claim 21, wherein said first set of machine-executable instructions includes machine-executable instructions for extracting facial features from a single 2D image of a front view of a face of the test subject.

33. A machine-readable storage medium according to claim 21, further comprising a third set of machine-executable instructions for executing an age-training module.

34. A machine-readable storage medium according to claim 21, wherein said second set of machine-executable instructions are designed and configured for execution on a smartphone or tablet computer.

35. A machine-readable storage medium according to claim 21, further comprising a third set of machine-executable instructions for receiving the image within a computer workstation via a camera in operative communication with the computer workstation.

36. A machine-readable storage medium according to claim 21, wherein second set of machine-executable instructions includes machine-executable instructions for executing a support vector regression.

* * * * *